Figure 1:
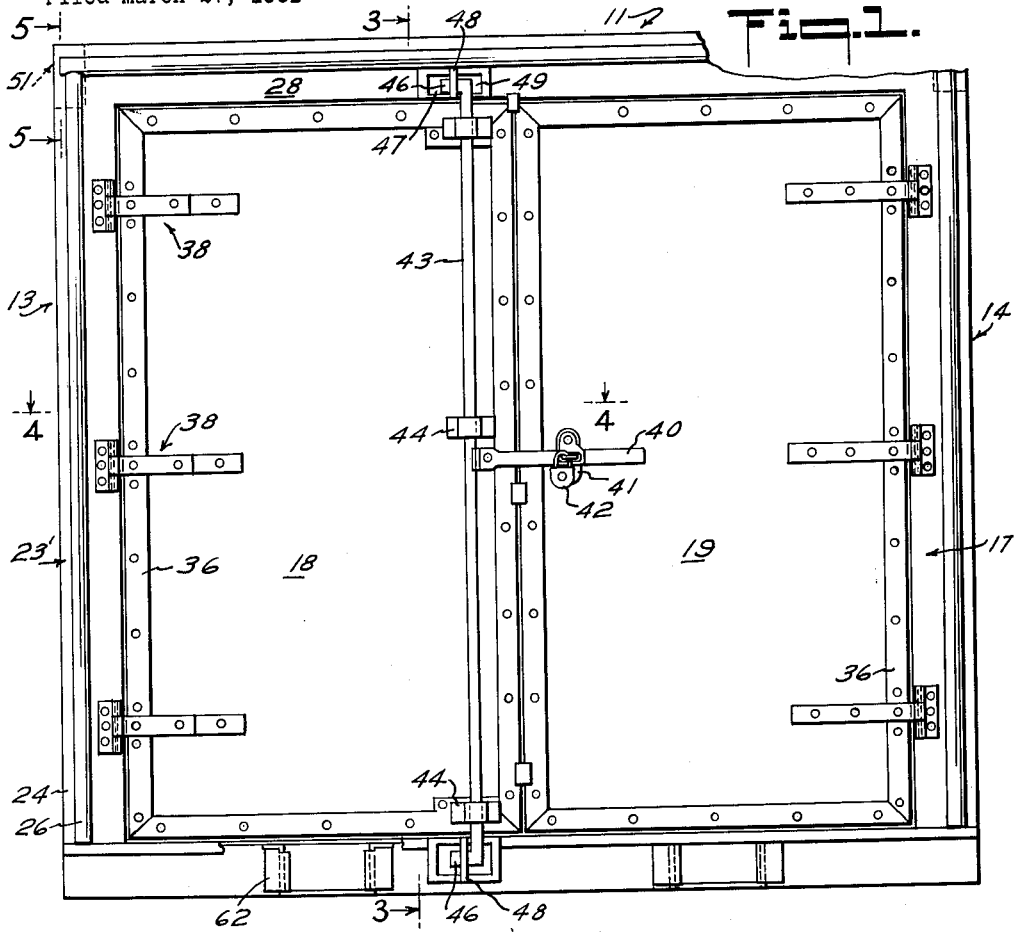

May 1, 1962 M. GURALNICK ET AL 3,032,227
CARGO CONTAINER
Filed March 27, 1961 2 Sheets-Sheet 1

INVENTORS
MORRIS GURALNICK &
DE WAYNE TITUS
BY Gardner & Zimmerman
ATTORNEYS

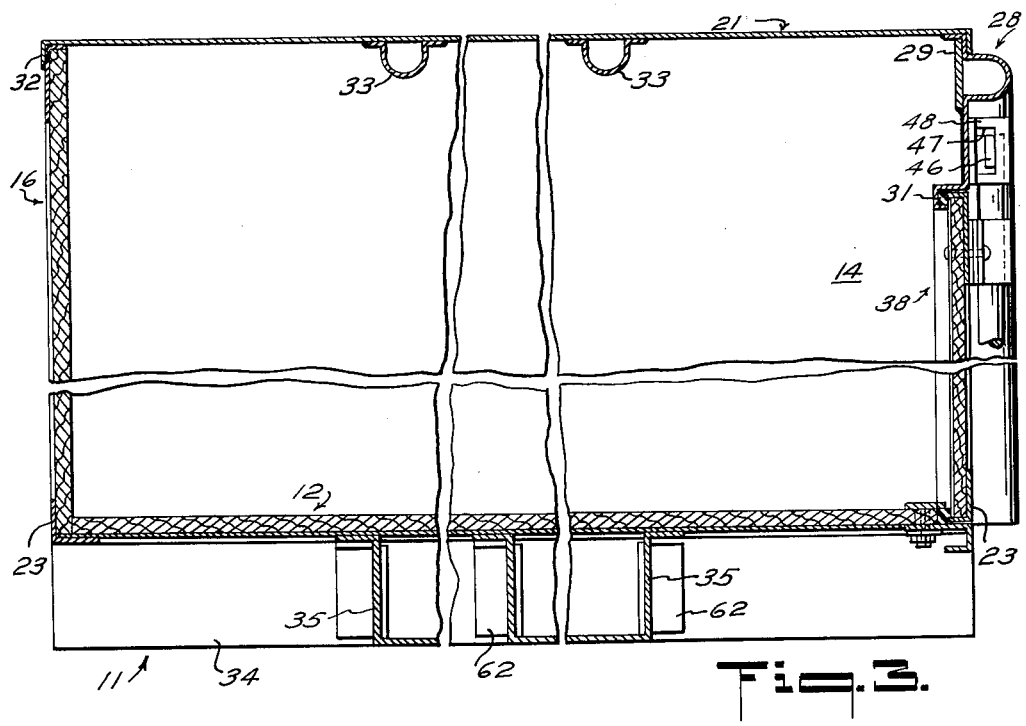
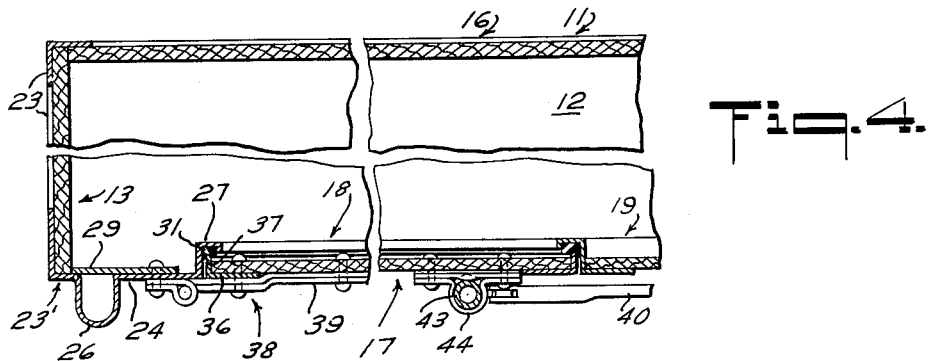
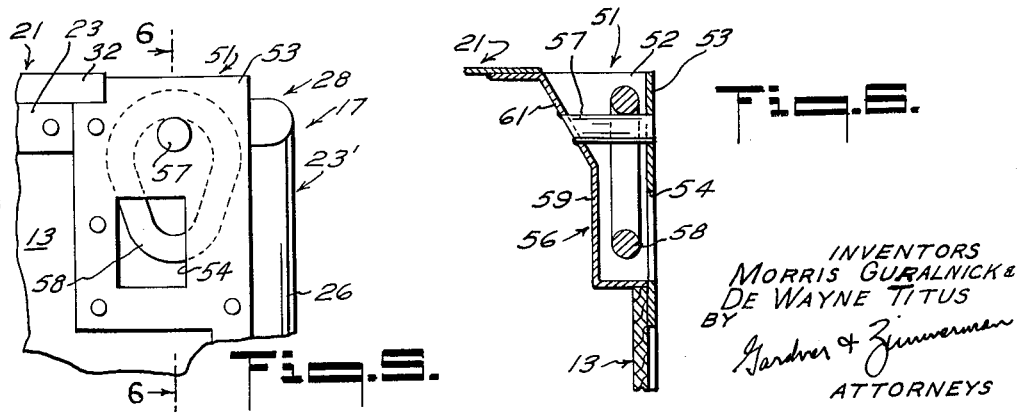

3,032,227
CARGO CONTAINER
Morris Guralnick, 341 Market St., San Francisco, Calif., and De Wayne Titus, 35888 Niles Blvd., Hayward, Calif.
Filed Mar. 27, 1961, Ser. No. 98,480
2 Claims. (Cl. 220—1.5)

This invention relates to a container within which a very large amount of cargo may be packed for loading and storage aboard ship or the like.

In the shipping industry considerable handling is involved in the loading, unloading and storage of cargo. This is due to the cargo being conventionally packed in small size containers such as boxes, drums, or the like, which are transportable by hand or with the aid of fork lifts or other relatively light duty conveying devices. With cargo in the form of goods packed in such small size containers an extremely large quantity of the containers must be handled many times in shipping the goods from their point of origin to their destination. In addition to the handling involved, for example, in loading the containers aboard trucks, boxcars, etc., for transport to a port of embarkation, unloading the containers from these conveyances and in turn loading them aboard ship, unloading them from the ship and loading them aboard land conveyances at the port of destination, etc., considerable handling is required in stacking and rigging the containers in each of the conveyances for compact shipment.

It is therefore an important object of the present invention to provide a cargo container of relatively large size that is capable of containing a vast plurality of small size containers or other cargo whereby a manifest reduction in the handling of cargo is attained.

Another object of the invention is the provision of a large size cargo container that is designed to have a maximum of storage space.

It is still another object of the invention to provide a cargo container of the class described that is provided with retractable lifting brackets at its upper surface to facilitate loading operations and yet permit stacking of a number of the containers.

It is yet another object of the invention to provide a cargo container of the class described that is designed to facilitate free circulation of air between containers when a number of them are stacked for shipment.

Still another object of the invention is to provide a water-tight cargo container.

A further object of the invention is to provide a cargo container of the class described which, while being of extremely rugged construction, is economical in manufacture.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 2:
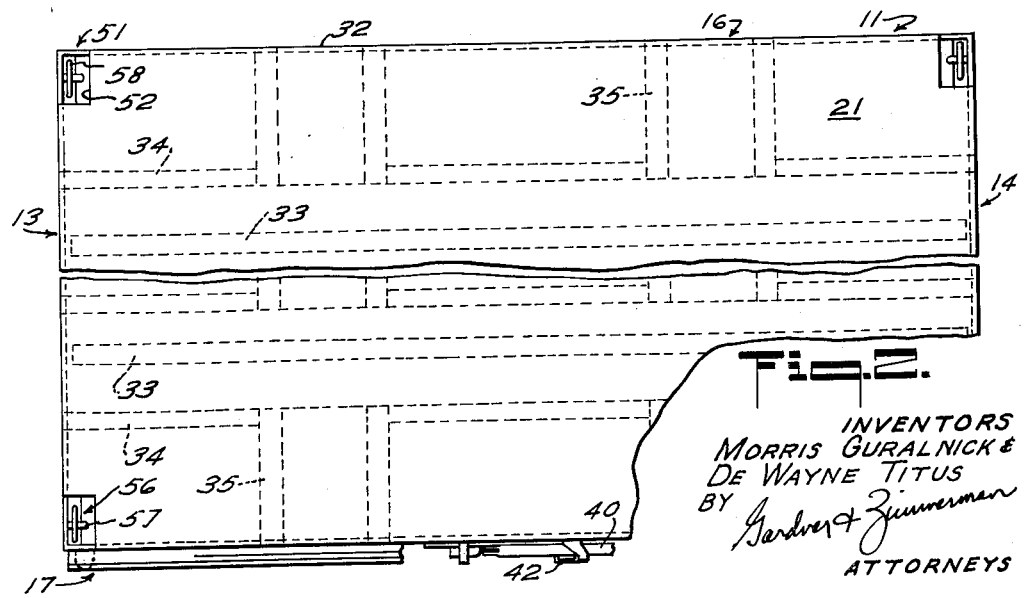

FIGURE 1 is a side elevational view of the cargo container of the present invention, FIGURE 2 is a plan view of the cargo container, FIGURE 3 is a sectional view taken at line 3—3 of FIGURE 1 and illustrating particularly the economical rigid reenforced construction of the container.

FIGURE 4 is a sectional view taken at line 4—4 of FIGURE 1 and illustrating particularly the sealed, latchable, door construction of the container, FIGURE 5 is an enlarged fragmentary end view of the container illustrating one of the corner mounted retractable lifting brackets thereof, and FIGURE 6 is a sectional view taken at line 6—6 of FIGURE 5, illustrating further details of the lifting bracket.

Referring now to the drawings there is seen to be provided a cargo container 11 of relatively large size, e.g., hundreds of cubic feet volume, which is capable of containing a vast plurality of boxes or other cargo containers of conventionally much smaller size. In order that the container withstand the substantial load which commonly corresponds to such a volume of cargo, and yet be economical in manufacture, the container preferably is for the most part of metal reinforced wood construction. More specifically, the container preferably comprises a rectangular floor 12 to which marginal upright side walls 13, 14 and a back wall 16 are secured, the floor and walls being all of metal reenforced wood. In addition, the container includes a front wall 17 preferably in the form of centrally intersecting metal reenforced wood doors 18, 19. A roof 21 is secured to the upper edges of the back, front, and side walls to complete the basic container construction, the roof being preferably of reenforced sheet steel or equivalent metal so as to provide adequate support for several of the containers 11 that might be stacked on top of each other.

To provide the reenforcing of the side walls 13, 14 and back wall 16, sheet steel or equivalent metal angle members 23 are marginally secured about the wood panels of the respective walls and are secured to each other to form a rigid substantially cubical framework. The angle members of the framework thus serve also as edge joints for the wall panels as well as the floor panel. The front vertical angle members 23' of the framework are, moreover, provided with extended front leg portions 24, each including a marginal strengthening rib 26 and inwardly turned groove defining reentrant edge 27. The angle members 23' cooperate with longitudinal angle members 28 of like configuration and secured to their opposite ends to define rigid door frame structure at the front wall 17 for supporting the doors 18, 19. Added rigidity may be advantageously provided in the door frame structure by means of a flat backing frame 29 secured to the inner faces of the front leg portions of the respective angle members 23', 28 in overlying relation to the strengthening ribs. The grooves defined by the reentrant edges 27 of the angle members 23' and the like reentrant edges of the longitudinal angle members 28 appropriately intersect to form a seat for a rectangular gasket 31 or equivalent sealing member. When the doors are closed they marginally abut the gasket to provide a water-tight seal about the door opening. The horizontal leg of the upper angle member 28, moreover, is end secured to the angle members 23 at the upper edges of the side walls 13, 14 such that these angle members together with the angle member at the upper edge of rear wall 16 form an annular rectangular flange for facilitating rigid attachment of the roof 21 to the walls. The roof is formed with a depending rim 32 for flush abutment with the vertical legs of the angle members and is attached thereto as by welding. An extremely satisfactory edge support of the roof is thereby provided, and the roof is rendered capable of supporting a substantial load merely by the securance of several longitudinal reenforcing ribs 33 to its undersurface.

Additional reenforcing of the floor 12 is facilitated by a plurality of longitudinal channel members 35 and a plurality of transverse channel members 34 secured to the underside of the floor panel in a grid-like pattern. Aside from reenforcing the floor, the channel members serve as support skids for the container. Moreover, the grid-like pattern of the channel members facilitates circulation of air into the spaces therebetween, as well as into the passages defined between the legs of the respective members. Hence, when a number of the containers are stacked, air is free to circulate therebetween.

Considering now the structure of the doors 18, 19 in greater detail, it should be noted that each door is constructed of a wood panel with a metal angle member frame 36 secured about its edges. The peripheral dimensions of the doors as rimmed by the frames 36 are slightly greater than the dimensions of the gasket 31. In addition, the side legs of the angle member frames 36 extend slightly beyond the back sides of the door panels, as indicated at 37 in FIGURE 4, such that these projecting edges of the frames are depressed into the gasket when the doors are closed, thereby providing the water-tight seal of previous mention. As regards the manner in which the doors are secured to the front of the container, it is first to be noted that when the doors are seated against the gasket, the front surfaces of the doors are flush with the front surface of the door frame structure. This flush disposition of the doors is facilitated by the reentrant gasket holding edges of the door frame angle members 23', 28. A plurality of hinges 38 secured to the angle members 23' and having tongues 39 extending therefrom into attachment with the flush front surface of each door consequently facilitate ready hinged attachment of the doors to the container. By virtue of the "French" arrangement of the doors 18, 19, an extremely large access opening to the interior of the container is provided when the doors are pivoted open.

In order that the contents of the container may be secured against pilfering and the like, provision is made to lock the doors 18, 19. More specifically, a hasp 40 is secured to one door 18 and adapted to engage a U bracket 41 secured to the other door 19. With the hasp engaging the U bracket, a padlock 42 may be inserted through the eye defined by the bracket and locked to secure the doors. In addition, a keeper 43 is preferably provided to restrain the doors against opening by shifting or lurching of the cargo within the container. Such keeper may be advantageously in the form of a rod secured upon one door 18 by means of U-bracket 44 so as to be rotatable about a vertical axis. The opposite ends of the keeper rod are turned at right angles to the rod axis as indicated at 46 so as to be engageable with slots 47 in brackets 48 secured to, and projecting laterally from the door frame members 28. Slots 49 are additionally provided in the members 28 to communicate with the bracket slots 47 to receive the turned ends 46 when the keeper rod is rotated to a disengaged position.

As an extremely important feature of the invention, the container 11 is provided with lift hook means 51 at the four corners of the roof 21, which, while facilitating ready rigging of the container to a crane or the like during loading operations, are retractable to out-of-the-way positions beneath the roof surface subsequent to loading such that a number of the containers may be stacked on top of each other. To this end the roof 21 is provided with rectangular slots 52 at its four corners and angle brackets 53 are provided to secure the underlying corner intersecting ends of the frame members 23. Each angle bracket 53 is provided with an aperture 54 at one of its legs. In addition, brackets 56 are provided opposite the apertured legs of the brackets 53, the brackets 56 being secured between the roof, at positions adjacent the slots 52, and the brackets 53 at positions adjacent the lower edges of the apertures. A pin 57 is secured between each bracket 56 and the opposite apertured leg of the corresponding bracket 53, the pin being attached to the latter bracket at a point above its aperture. A lift ring 58 is engaged by each of the pins 57. The rings have much larger inner diameters than the outer diameters of the pins such that the rings are movable relative to the pins within the limits of the ring apertures. Consequently, the rings have normal positions retracted within the slots 52, the upper surfaces of the ring apertures resting upon the pins. The rings may be urged upwardly through the slots however to positions wherein the pins engage the lower surfaces of the ring apertures, the rings, when so positioned, projecting above the roof to permit four cornered attachment of crane lift lines or the like. Movement of the lift rings to their exposed positions is accomplished manually with access to the rings being provided through the bracket apertures 54. It is of importance to note that the mounting of the retractable rings is accomplished such that they may assume naturally inclined positions commensurate with the four cornered rigging to a crane while yet not detracting appreciably from the available storage space within the container. More specifically, each of the brackets 56 is preferably provided with a lower vertical section 59 closely spaced from the apertured leg of the corresponding bracket 53 by an amount that is slightly greater than the thickness of the ring. The vertical section then terminates in an inclined section 61 which diverges relative to the bracket 53 and extends upwardly into contact with the roof adjacent the corresponding corner slot 52. The pin 57 is disposed between the bracket 53 and the inclined section 61 of bracket 56 at a position that is upwardly spaced from the juncture between the inclined section and vertical section 59. When the ring is raised, it is hence free to assume, within the confines of the enlarged space between the inclined section 61 and bracket 53, positions that are inclined toward a vertical axis through the center of the roof and which would naturally occur upon four cornered rigging of the load. By virtue of the bracket including an inclined section and a vertical section as opposed to either an inclined section alone or a vertical section alone extending directly downward from the corner slot 52, a minimum of space is consumed by each of the brackets 56.

As a further adjunct to the invention, the cargo container is provided with tilting brackets 62 attached to the opposite ends of several of the channel skids 33, 34. The brackets are preferably of a J cross-section with the straight sides thereof secured to the outer side legs of the respective skids, and the curved sections thereof curving inwardly away from the ends of the skids. The curved sections of the brackets 62 may hence be readily engaged by a grappling hook or other implement manipulated by the loading personnel to tilt the container or otherwise guide same as it is suspended from a crane, etc.

What is claimed is:

1. In a cargo container including a rectangular floor, marginal side walls extending from said floor, and a roof secured to said side walls, retractable lift ring means comprising means defining slots at the respective corners of said roof, brackets secured between said roof and said side walls in underlying relation to said slots, pins respectively secured between said brackets and said side walls, and lift rings having a larger inner diameter than the outer diameter of said pins and circumscribing same.

2. A cargo container comprising a metal angle member cubical framework with apertures respectively adjacent its four upper corners, a floor secured to the bottom of said framework, side walls secured to the sides of said framework with one of said side walls including an access door, a roof secured to the top of said frame work and having slots formed at its four corners, brackets respectively secured between said roof and said framework in underlying relation to said slots, said brackets respectively having lower vertical sections in closely spaced parallel relation to said framework opposite said apertures and upper inclined sections extending to said roof in diverging relation to said framework, pins respectively secured between the inclined sections of said brackets and said framework, and lift rings having large inner diameters relative to the outer diameters of said pins and respectively circumscribing same.

References Cited in the file of this patent

UNITED STATES PATENTS

| | | |
|---|---|---|
| 1,506,598 | McMurdie | Aug. 26, 1924 |
| 2,301,444 | Olander | Nov. 10, 1942 |
| 2,839,309 | Turner | June 17, 1958 |
| 2,937,879 | Lion | May 24, 1960 |
| 2,947,436 | Kappen | Aug. 2, 1960 |

FOREIGN PATENTS

| | | |
|---|---|---|
| 412,297 | Great Britain | June 28, 1934 |